US008289889B2

(12) United States Patent
Lee et al.

(10) Patent No.: US 8,289,889 B2
(45) Date of Patent: Oct. 16, 2012

(54) METHOD AND DEVICE FOR MANAGEMENT OF FEMTO BASE STATION

(75) Inventors: Hyun Lee, Daejeon (KR); Won-Ik Kim, Daejeon (KR); Sung-Geun Jin, Daejeon (KR); Sung Kyung Kim, Daejeon (KR); Chul Sik Yoon, Seoul (KR); Namgi Kim, Suwon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 319 days.

(21) Appl. No.: 12/609,190

(22) Filed: Oct. 30, 2009

(65) Prior Publication Data

US 2010/0113049 A1 May 6, 2010

(30) Foreign Application Priority Data

Oct. 30, 2008 (KR) .......................... 10-2008-0107178
Nov. 12, 2008 (KR) .......................... 10-2008-0112413
Oct. 26, 2009 (KR) .......................... 10-2009-0101819

(51) Int. Cl.
*H04J 1/00* (2006.01)
*H04L 12/56* (2006.01)

(52) U.S. Cl. .......................... 370/278; 370/252; 370/331
(58) Field of Classification Search .................. 370/252, 370/331, 329, 278
See application file for complete search history.

(56) References Cited

U.S. PATENT DOCUMENTS

| 2009/0067417 A1* | 3/2009 | Kalavade et al. | 370/356 |
| 2009/0129333 A1* | 5/2009 | Khandekar et al. | 370/330 |
| 2011/0105129 A1* | 5/2011 | Kim et al. | 455/443 |

OTHER PUBLICATIONS

"Operation for inactive mode of femto base stations in IEEE 802.16m", Namgi Kim, et al., IEEE C802.16m-08/1303, Oct. 30, 2008.

* cited by examiner

*Primary Examiner* — John Pezzlo
(74) *Attorney, Agent, or Firm* — Kile Park Goekjian Reed & McManus PLLC

(57) ABSTRACT

A method for management of a base station according to the present invention includes: entering a first interval when a terminal is not present in a region of a first cell managed by the base station; receiving an interval switching request when the terminal enters a second cell that is larger than the first cell while including the first cell; and switching into a second interval other than the first interval in accordance with the interval switching request.

16 Claims, 10 Drawing Sheets

METHOD AND DEVICE FOR MANAGEMENT OF FEMTO BASE STATION

CROSS-REFERENCE TO RELATED APPLICATION

This application claims priority to and the benefit of Korean Patent Application Nos. 10-2008-0107178, 10-2008-0112413 and 10-2009-0101819 filed in the Korean Intellectual Property Office on Oct. 30, 2008, Nov. 12, 2008 and Oct. 26, 2009, the entire contents of which are incorporated herein by reference.

BACKGROUND OF THE INVENTION (a) Field of the Invention

The present invention relates to a method and a device for management of a femto base station.

(b) Description of the Related Art

A femto cell is an area where a wireless communication service is provided for a region within a diameter of, for example, 30 m. A femto base station managing the femto cell is installed at an office or a home, and uses a frequency that is the same as or different from other cells targeting a wider region than the femto cell.

Meanwhile, even when a terminal is not present in a region that the base station itself manages, the base station periodically broadcasts system information corresponding to the region that the base station itself manages against a time when the base station is connected to the terminal.

Since the range of the femto cell is comparatively small, when the femto base station periodically broadcasts the system information, interference with another cell base station using the same frequency as the femto base station or another femto base station may be generated.

Further, when the femto base station periodically broadcasts the system information, the femto base station consumes unnecessary power even when the terminal is not present.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a device for management of a femto base station having advantages of reducing inter-cell interference and power consumption by minimizing the amount of information to be broadcasted when a terminal that the femto base station itself should manage is not present.

A first embodiment of the present invention provides a method for management of a base station that entering a first interval when a terminal is not present in a region of a first cell managed by the base station; receiving an interval switching request when the terminal enters a second cell that is larger than the first cell while including the first cell; and switching into a second interval other than the first interval in accordance with the interval switching request.

The second interval may be an available interval.

The first interval may be a partially-available interval or an unavailable interval.

The receiving may include receiving the interval switching request from a macro base station managing the second cell.

The method may further include periodically broadcasting only a preamble in the first interval.

The method may further include periodically broadcasting system information in the second interval.

The receiving may include receiving the interval switching request from the terminal.

The method may further include periodically broadcasting only the preamble and slimmed broadcast information in the first interval, wherein the slimmed broadcast information is information for allowing the terminal to access an uplink control channel of the base station in the first interval.

The first cell may be a femto cell.

The method may further include judging whether or not the terminal transmits and receives data through the base station.

The method may further include receiving a request for switching into another interval after switching into the second interval and switching into a third interval, wherein the first interval is the unavailable interval, the second interval is the partially-available interval, and the third interval is the available interval.

Entering the first interval may be performed when the terminal is in an idle state.

A second embodiment of the present invention provides a method for management of a femto base station of a femto cell included in a macro cell in a macro base station of the macro cell that includes: judging whether a terminal that is accessible to the femto cell enters the macro cell; and transmitting an interval switching request to the femto base station when the terminal enters the macro cell.

The femto base station may be switched into an available interval from an interval that is operated when the terminal is not present in the femto cell region in accordance with the interval switching request.

The interval that is operated when the terminal is not present may be a partially-available interval or an unavailable interval.

A third embodiment of the present invention provides a device for managing an operation of a first base station managing a first cell that includes: a reception unit receiving an interval switching request from a second base station managing a second cell that is larger than the first cell while including the first cell; and an interval switching unit switching the interval of the first base station in accordance with the interval switching request.

The interval switching unit may switch from an interval that is operated when the terminal is not present in the first cell region in accordance with the interval switching request into the available interval.

The interval that is operated when the terminal is not present may be a partially-available interval or an unavailable interval.

The broadcasting unit may further include a broadcasting unit that does not broadcast when the first base station is in the unavailable interval, broadcasts only a preamble or slimmed broadcast information in addition to the preamble when the first base station is in the partially-available interval, and broadcasts all system information when the first base station is in the available interval.

The device may further include a judgment unit that judges the legality of the interval switching request.

According to an embodiment of the present invention, it is possible to reduce inter-cell interference and power consumption by minimizing the amount of information to be broadcasted when a terminal that the femto base station itself should manage is not present. When the inter-cell interference is reduced, the performance of a system is improved, and when the power consumption is reduced, it is possible to improve mobility of the femto base station by miniaturizing the femto base station.

DETAILED DESCRIPTION OF THE EMBODIMENTS

Figure 1:
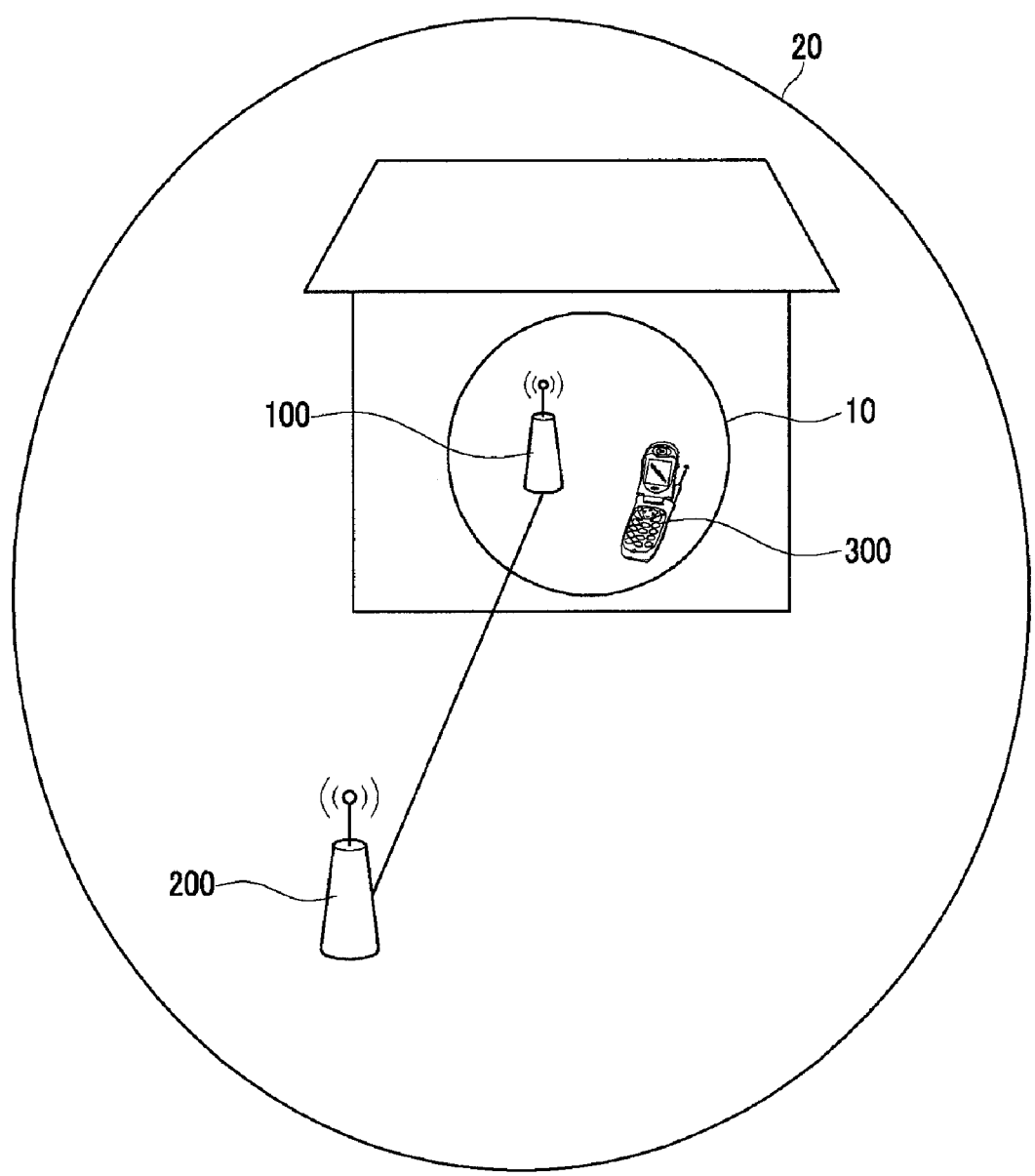
FIG. 1 is a schematic diagram of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the evolved node B, the base transceiver station, the MMR-BS, etc.

Hereinafter, a method and a device for management of a femto base station according to an exemplary embodiment of the present invention will be described in detail with reference to the accompanying drawings.

FIG. 1 is a schematic diagram of a wireless communication system according to an exemplary embodiment of the present invention.

Referring to FIG. 1, the wireless communication system according to the exemplary embodiment of the present invention includes a femto base station 100, a macro base station 200, and a terminal 300.

The femto base station 100 is a miniaturized base station that provides a wireless communication service to, for example, a region having a radius of 10 cm to 30 m and manages a femto cell 10, and for example, is installed in a shadow area in which radio waves of other cells are deteriorated, such as a home or the inside of a building, to secure the quality of a mobile communication service. Herein, femto base station 100 and femto cell 10 are terms that are not limited to a dictionary definition of femto, and include a miniaturized base station and a miniaturized cell range having a name of a unit that is larger or smaller than the femto base station 100 and the femto cell 10.

The femto base station 100 uses a public Internet network that is generally used on a wired Internet network as a backbone network. The femto base station 100 supports a normal operation mode and a low duty operation mode.

The normal operation mode is a mode in which all function of the femto base station 100 are is generally actuated and the low duty operation mode is a mode for reducing interference in an adjacent cell and power consumption when the terminal does not exist in the femto cell managed by the femto base station 100 or the terminal existing in the femto cell 10 is in an idle/sleep mode. The low duty operation mode includes an available interval (AI) and an unavailable interval (UAI).

The femto base station 100 can perform page, transmission of system information, ranging, transmission of data traffic, etc. during the available interval. The femto base station 100 can perform synchronization with the macro base station 200 or perform measurement of interference with the adjacent cell without performing transmission onto an air interface during the unavailable interval. Meanwhile, the duty operation mode may further include a partially available interval in addition to the available interval and the unavailable interval and the femto base station 100 can transmit only a preamble during the partial available interval.

The macro base station 200 manages a macro cell 20. The macro cell 20 includes the femto cell 10. The macro cell 20 is a cell in a region that is larger than the femto cell 10, and is not limited to a dictionary definition of macro.

The macro base station 200 and the femto base station 100 are connected to each other through a wired network. The macro base station 200 can manage the femto base station 100 that is connected thereto.

The terminal 300 as an endpoint of a wireless channel accesses the femto base station 100 and the macro base station 200 to transmit and receive data.

Hereinafter, a method for management of a femto base station according to an exemplary embodiment of the present invention will be described in detail with reference to FIGS. 2, 3, and 4.

Figure 2:
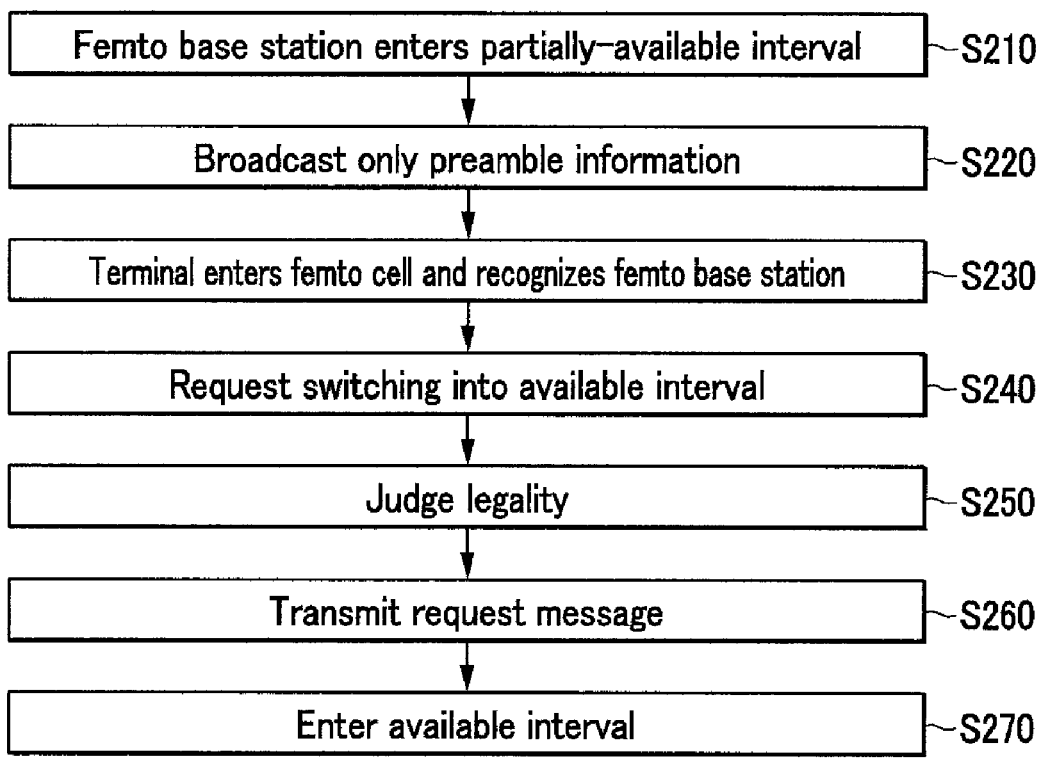
FIG. 2 is a flowchart showing a method for management of a femto base station in sequence according to a first embodiment of the present invention.
Figure 3:
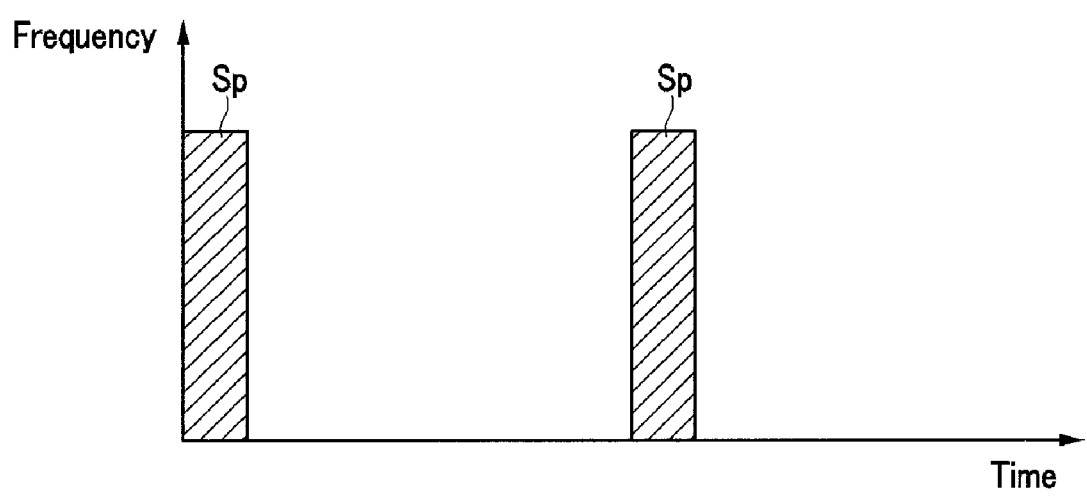
FIG. 3 is a diagram showing a transmission signal of a femto base station according to an exemplary embodiment of the present invention.
Figure 4:
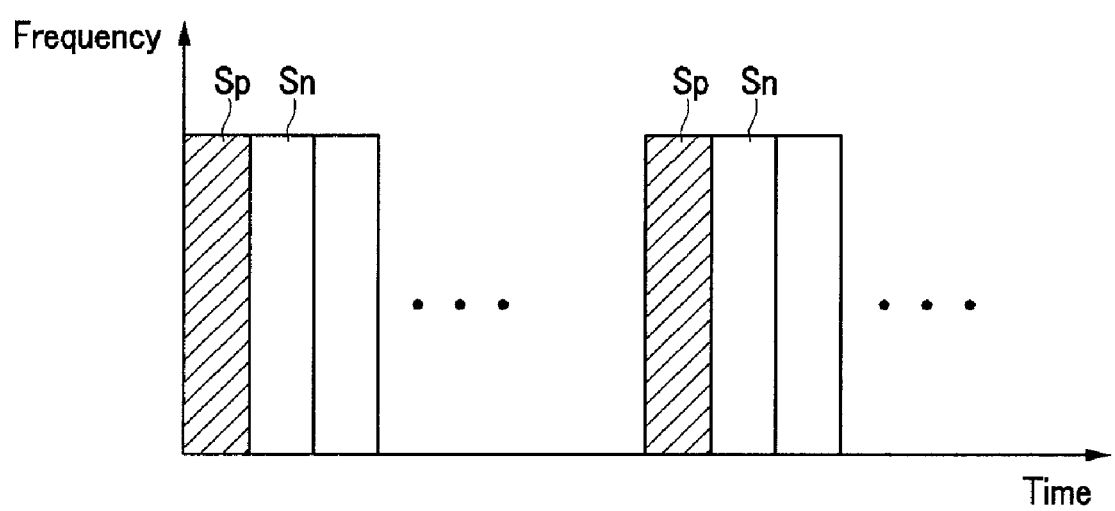
FIG. 4 is a diagram showing another transmission signal of a femto base station according to an exemplary embodiment of the present invention.

FIG. 2 is a flowchart showing a method for management of a femto base station in sequence according to a first embodiment of the present invention, DeletedTexts FIG. 3 is a diagram showing a transmission signal of a femto base station according to an exemplary embodiment of the present invention, and FIG. 4 is a diagram showing another transmission signal of a femto base station according to an exemplary embodiment of the present invention.

Referring to FIG. 2, first, the femto base station 100 enters the low duty operation mode and enters the partially available interval thereof when the terminal 300 is not present in the femto cell 10 managed by the femto base station 100 or the terminal present in the femto cell 10 is an idle/sleep mode (S210). In the partially available interval, the femto base station 100 broadcasts only its own preamble SP including cell ID information, as shown in FIG. 3 (S220).

The terminal 300 enters the femto cell 10 and recognizes the femto base station 100 through the preamble broadcasted by the femto base station 100 (S230). Subsequently, when the terminal 300 wants to receive data through the recognized femto base station 100, the terminal 300 requests the macro base station 200 managing the femto base station 100 to switch the femto base station 100 into the available interval (S240).

The macro base station 200 that receives the request for switching into the available interval judges the legality of the terminal 300 (S250). That is, the macro base station 200 judges whether the terminal 300 requesting switching into the available interval is a legal terminal 300 that can switch the corresponding femto base station 100 into the available interval (S250). Rather than the macro base station 200, the femto base station 100 may perform the legality judging step (S250) by itself. For this, the macro base station 200 transfers the request of the terminal 300 for switching into the available interval to the femto base station 100 to allow the femto base station 100 itself to judge the legality.

Meanwhile, the femto cell 10 is divided into a private group femto cell and an open group femto cell. The private group femto cell is also referred to as a closed subscriber group (CSG), and is a femto cell having a previously restricted target that can transmit and receive data through the corresponding femto cell. The open group femto cell is also referred to as an open subscriber group, and is a femto cell having no previously restricted target that can transmit and receive data through the corresponding femto cell and is permitted for all terminals. The legality at the legality judging step (S250) may be a step of judging whether or not the terminal 300 requesting switching into the available interval is a previously determined target in the case where the femto cell 10 is the private group femto cell.

As a result of the legality judgment (250), when the terminal 300 requesting switching the available interval is judged to be a legal terminal, the macro base station 200 transmits a message requesting that the terminal 300 switches into the available interval to the femto base station 100 (S260).

At this time, as shown in FIG. 4, the femto base station 100 is switched into the available interval in which a symbol Sn including necessary system information in addition to the preamble Sp periodically broadcasts (S270).

Thereafter, the terminal 300 can transmit and receive data through the femto base station 100.

As such, the femto base station 100 is switched into the available interval or the partially available interval as necessary. In the partially available interval, the femto base station 100 can reduce the inter-cell interference and power consumption by broadcasting only the preamble. When the inter-cell interference is reduced, the performance of a system is improved, and when the power consumption is reduced, the mobility of the femto base station can be improved by miniaturizing the femto base station.

Hereinafter, a method for management of a femto base station according to another embodiment of the present invention will be described in detail with reference to FIGS. 5 and 6.

Figure 5:
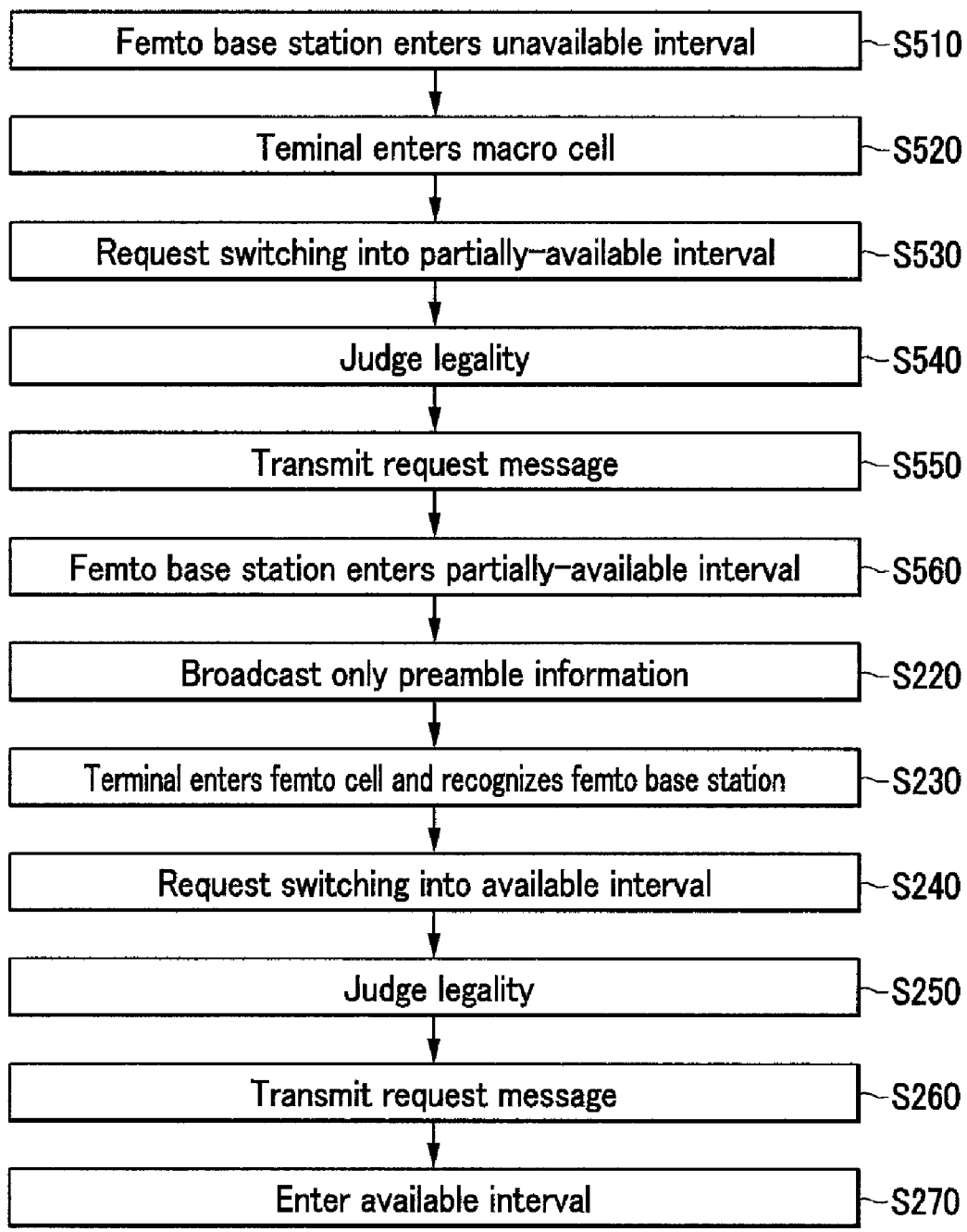
FIG. 5 is a flowchart showing a method for management of a femto base station in sequence according to a second embodiment of the present invention.
Figure 6:
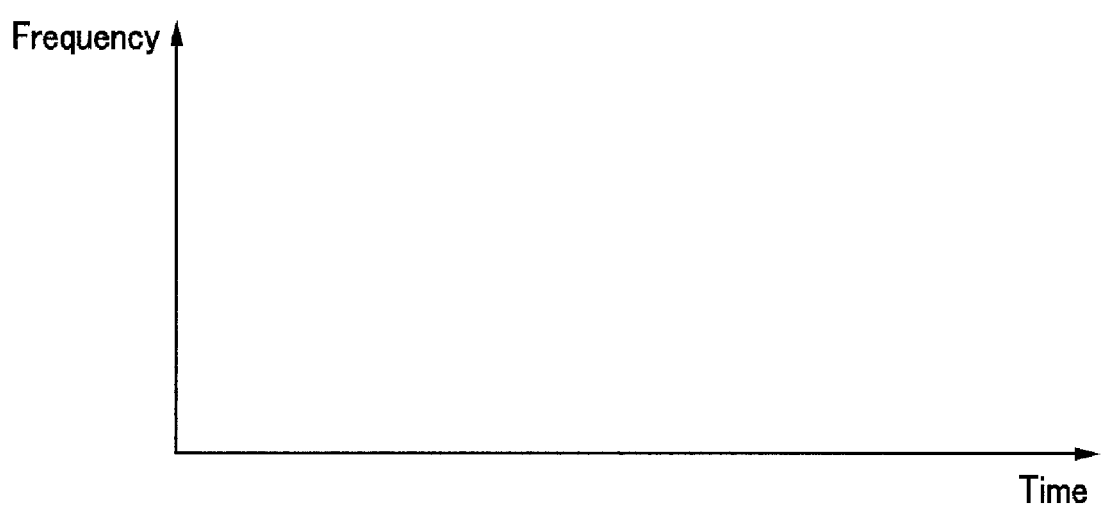
FIG. 6 is a diagram showing a transmission signal in an unavailable interval of a femto base station according to an exemplary embodiment of the present invention.

FIG. 5 is a flowchart showing a method for management of a femto base station in sequence according to a second embodiment of the present invention, and FIG. 6 is a diagram showing a transmission signal in an unavailable interval of a femto base station according to an exemplary embodiment of the present invention.

Referring to FIG. 5, first, the femto base station 100 enters the low-duty operation mode and enters the unavailable interval thereof when the terminal 300 is not present in the femto cell 10 managed by the femto base station 100 (S510). In the unavailable interval, the femto base station 100 transmits no transmission signal, as shown in FIG. 6.

The terminal 300 enters the macro cell 10 managed by the macro base station 200 connected to the femto base station 100 (S520), and requests the macro base station 200 to switch the femto base station 100 into the partially available interval (S530).

At this time, the macro base station 200 judges whether the terminal 300 requesting switching into the partially available interval is a legal terminal 300 that can request switching the corresponding femto base station 100 into the partially available interval (S540). Rather than the macro base station 200, the femto base station 100 may perform the legality judging step (S540) by itself. When the corresponding terminal is judged to be a legal terminal 300, the macro base station 200 transmits a message of requesting switching into the partially available interval to the femto base station 100 (S550).

The femto base station 100 that receives the request message enters the partially available interval (S560). At this time, the femto base station 100 broadcasts only the preamble in the partially available interval, as described in FIG. 2 (S220).

Subsequently, similar to as described in FIG. 2, the step (S230) at which the terminal enters the femto cell and recognizes the femto base station, the step (S240) of requesting switching into the available interval, the legality judging step (S250), the request message transmitting step (S260), and the available interval entering step (S270) are performed. At this time, the femto base station 100 can broadcast all information on the system and the terminal 300 can transmit and receive data through the femto base station 100, as shown in FIG. 4.

As such, the femto base station 100 is switched into the unavailable interval, the partially available interval, and the available interval depending on the presence of the terminal 300.

Hereinafter, a method for management of a femto base station according to another embodiment of the present invention will be described in detail with reference to FIG. 7.

Figure 7:
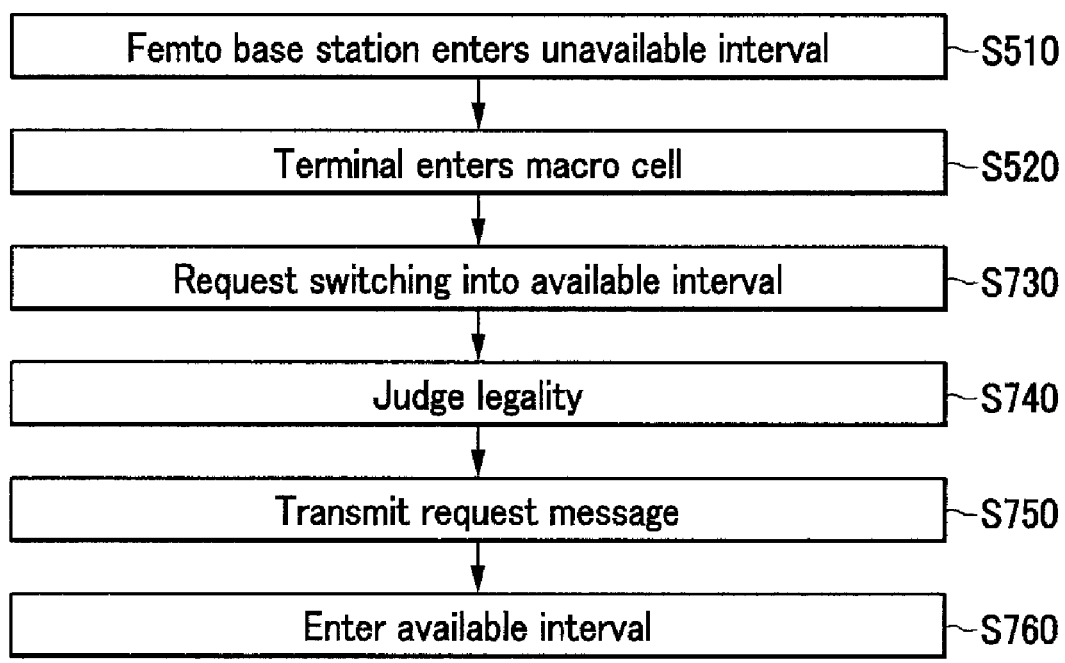
FIG. 7 is a flowchart showing a method for management of a femto base station in sequence according to a third embodiment of the present invention.

FIG. 7 is a flowchart showing a method for management of a femto base station in sequence according to a third embodiment of the present invention.

Referring to FIG. 7, similar to the embodiment shown in FIG. 5, the femto base station 200 enters the unavailable interval (S510) and the terminal 300 enters the macro cell 20 (S520). Thereafter, the terminal 300 requests the macro base station 200 to switch the femto base station 100 into the available interval (S730).

At this time, the macro base station 200 judges whether the terminal 300 requesting switching into the available interval is a legal terminal 300 that can request switching the corresponding femto base station 100 into the available interval (S740). Rather than the macro base station 200, the femto base station 100 may perform the legality judging step (S740)

by itself. When the corresponding terminal is judged to be a legal terminal 300, the macro base station 200 transmits a message requesting switching into the available interval to the femto base station 100 (S750).

The femto base station 100 that receives the request message enters the available interval (S760). At this time, the femto base station 100 can broadcast all information on the system and the terminal 300 can transmit and receive data through the femto base station 100, as shown in FIG. 4.

Hereinafter, a method for management of a femto base station according to another embodiment of the present invention will be described in detail with reference to FIG. 8.

Figure 8:
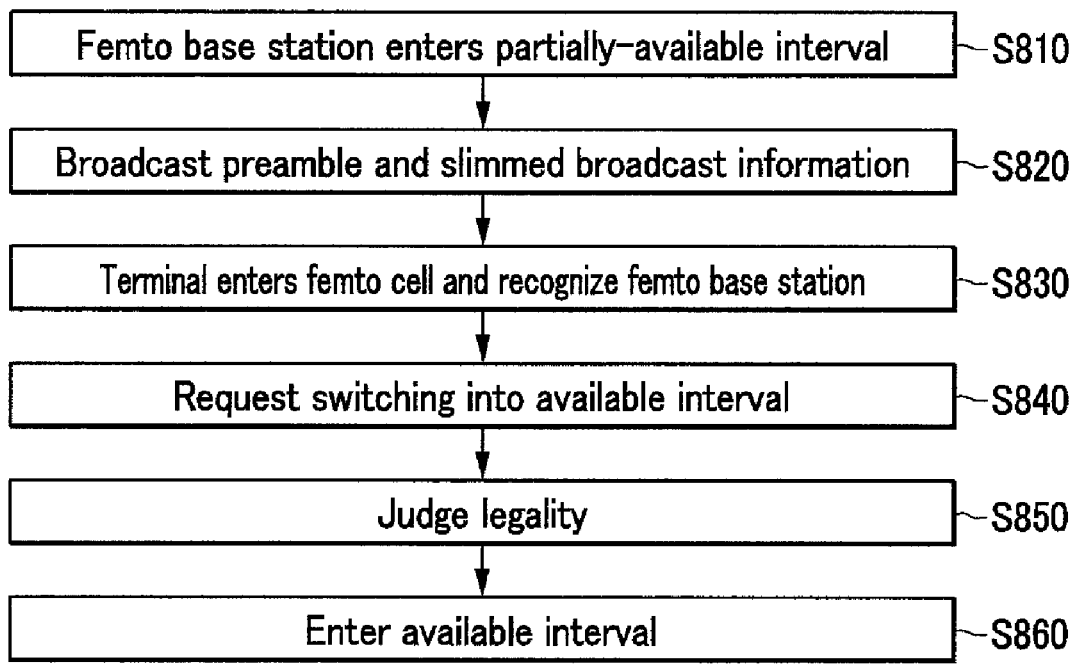
FIG. 8 is a flowchart showing a method for management of a femto base station in sequence according to a fourth embodiment of the present invention.
Figure 9:
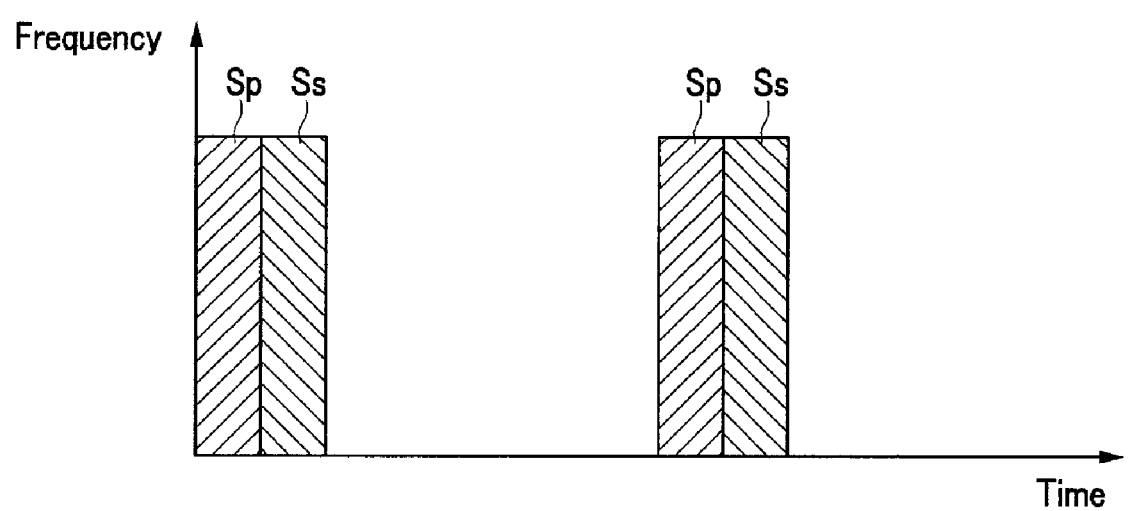
FIG. 9 is a diagram showing a transmission signal in a partially-available interval of a femto base station according to another embodiment of the present invention.

FIG. 8 is a flowchart showing a method for management of a femto base station in sequence according to a fourth embodiment of the present invention, and FIG. 9 is a diagram showing a transmission signal in a partially available interval of a femto base station according to another embodiment of the present invention.

Referring to FIG. 8, first, the femto base station 100 enters the partially available interval (S810). In the partially available interval, the femto base station 100 broadcasts the preamble Sp and slimmed broadcast information Ss, as shown in FIG. 9 (S820).

The slimmed broadcast information is minimum information periodically broadcasted by the femto base station 100 in the partially available interval, and contains information for allowing the terminal 300 to access an uplink control channel in the partially available interval of the femto base station 100. When the amount of the slimmed broadcast information Ss is increased, the inter-cell interference amount is increased. Therefore, it is preferable to broadcast a minimum amount.

The macro base station 200 previously notifies some of the position and state information of the uplink control channel of the femto base station 100 common to the macro cell 20 or other femto cells through a system information channel, etc. to the terminal, and the femto base station 100 in the partially available interval can transmit only information other than the uplink channel of the macro cell 20 or other femto cells to the terminal 300 as the slimmed broadcast information Ss. At this time, in the partially available interval, it is possible to reduce the amount of slimmed broadcast information Ss broadcasted by the femto base station 100.

The terminal 300 enters the femto cell 10 and recognizes the femto base station 100 through the preamble Sp broadcasted by the femto base station 100 (S830). The terminal 300 requests the femto base station 100 to be switched into the available interval (S840).

At this time, the terminal 300 grasps the position and state of the uplink control channel of the femto base station 100 through the slimmed broadcast information Ss broadcasted by the femto base station 100 and requests the femto base station 100 to switch into the available interval using the uplink control channel (S840).

Meanwhile, the terminal 300 may request switching into the available interval by using a default uplink control channel. The default uplink control channel is the femto cell uplink control channel to fix the position and state of the channel for the terminal 300 to transmit the request for switching into the available interval to the femto base station 100. The macro base station 200, etc. can previously transmit information on the position and state of the default uplink control channel of the femto cell 10 to the terminal 300 through the system information channel, etc. In this case, the femto base station 100 may reduce the slimmed broadcast information Ss or may not use the slimmed broadcast information Ss in the partially available interval.

The femto base station 100 that receives the request for switching into the available interval judges the legality of the terminal that requests switching into the available interval (S850). Thereafter, the femto base station 100 enters the available interval (S860). At this time, the femto base station 100 can periodically broadcast the symbol Sn including all necessary information in addition to the preamble Sp and the terminal 300 can transmit and receive data through the femto base station 100, as shown in FIG. 4.

Meanwhile, similar to the embodiment of FIG. 5, when the femto base station 100 is switched from the unavailable interval into the partially available interval or switched from the partially available interval into the available interval, the terminal 300 may directly make the switching request not to the macro base station 200 but to the femto base station 100.

Further, similar to the embodiment of FIG. 7, when the femto base station 100 is switched from the unavailable interval into the available interval, the terminal 300 may directly make the switching request not to the macro base station 200 but to the femto base station 100.

Hereinafter, a device for management of a femto base station according to another embodiment of the present invention will be described in detail with reference to FIG. 10.

Figure 10:
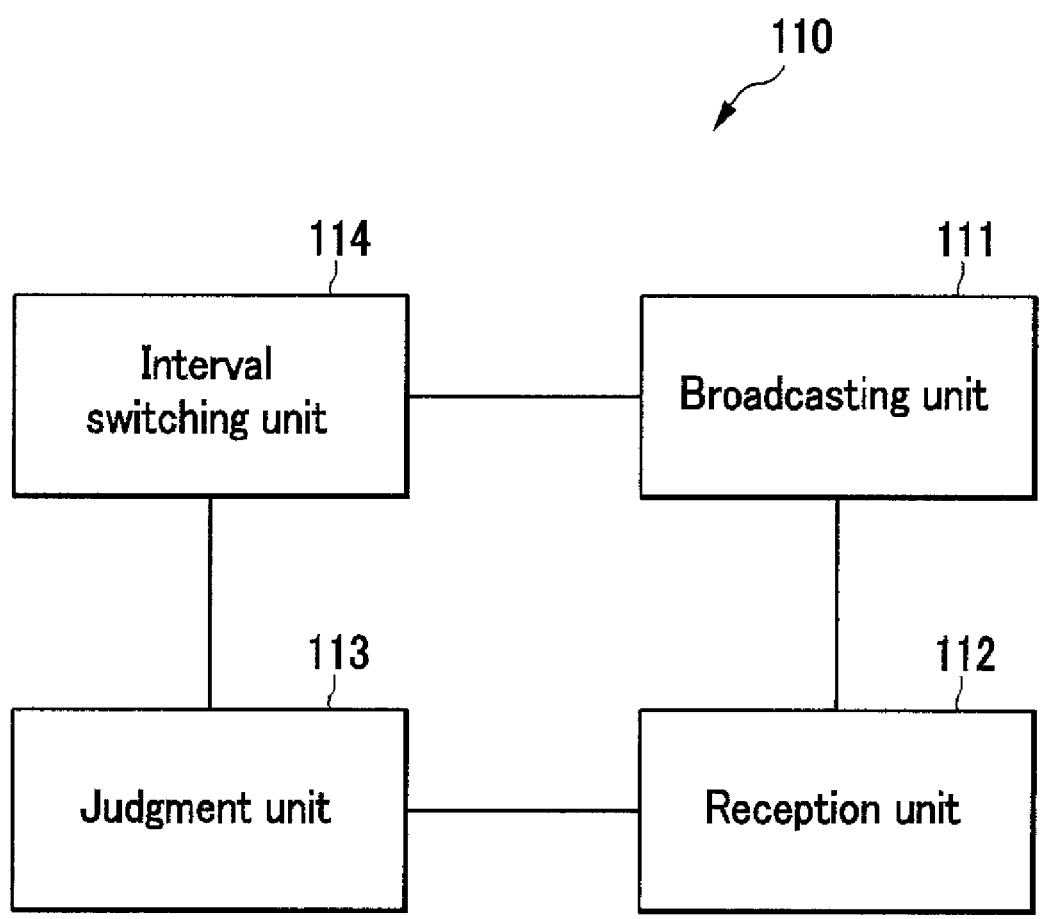
FIG. 10 is a block diagram schematically showing a device for management of a femto base station in sequence according to another embodiment of the present invention.

FIG. 10 is a block diagram schematically showing a device for management of a femto base station in sequence according to another embodiment of the present invention.

Referring to FIG. 10, a management device 110 of a femto base station 100 includes a broadcasting unit 111, a reception unit 112, a judgment unit 113, and an interval switching unit 114.

The broadcasting unit 111 broadcasts a signal depending on an unavailable interval, a partially available interval, and an available interval of the femto base station 100. The broadcasting unit 111 broadcast no signal in the unavailable interval, as in FIG. 6. The broadcasting unit 111 broadcasts only the preamble Sp in the partially available interval as in FIG. 3, or broadcasts the slimmed broadcast information Ss in addition to the preamble Sp as in FIG. 9. The broadcasting unit 111 broadcasts the preamble Sp and all the system information Sn in the available interval, as in FIG. 4.

The reception unit 112 receives an interval switching request from the terminal 300.

The judgment unit 113 judges the legality of the switching request of the terminal 300 with respect to the interval switching request received by the reception unit 112.

The interval switching unit 114 switches the interval of the femto base station 100 into any one of the unavailable interval, the partially available interval, and the available interval in response to the interval switching request of the terminal 300 in accordance with a suitability judgment result of the judgment unit 113. Further, the interval switching unit 114 switches the interval of the femto base station 100 into any one of the unavailable interval, the partially available interval, and the available interval in response to the interval switching request of the terminal 300 in accordance with the legality judgment result of the judgment unit 113.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for management of a base station, comprising:
   entering a first interval when a terminal is not present in a region of a first cell managed by the base station;
   receiving an interval switching request when the terminal enters a second cell that is larger than the first cell while including the first cell;
   switching into a second interval other than the first interval in accordance with the interval switching request; and
   periodically broadcasting only a preamble in the first interval.

2. The method of claim 1, wherein
   the second interval is an available interval (AI).

3. The method of claim 2, wherein
   the first interval is a partially-available interval or an unavailable interval.

4. The method of claim 1, wherein
   the receiving includes receiving the interval switching request from a macro base station managing the second cell.

5. The method of claim 1, further comprising
   periodically broadcasting system information in the second interval.

6. The method of claim 1, wherein
   the receiving includes receiving the interval switching request from the terminal.

7. The method of claim 1, wherein
   the first cell is a femto cell.

8. The method of claim 1, further comprising
   judging whether or not the terminal transmits and receives data through the base station.

9. The method of claim 1, further comprising:
   receiving a request for switching into another interval after switching into the second interval; and
   switching into a third interval,
   wherein the first interval is the unavailable interval, the second interval is the partially-available interval, and the third interval is the available interval.

10. The method of claim 1, wherein
    entering the first interval is performed when the terminal is in an idle state.

11. A method for management of a base station, comprising:
    entering a first interval when a terminal is not present in a region of a first cell managed by the base station;
    receiving an interval switching request when the terminal enters a second cell that is larger than the first cell while including the first cell;
    switching into a second interval other than the first interval in accordance with the interval switching request; and
    periodically broadcasting only a preamble and slimmed broadcast information in the first interval,
    wherein the slimmed broadcast information is information for allowing the terminal to access an uplink control channel of the base station in the first interval.

12. A method for management of a femto base station of a femto cell included in a macro cell in a macro base station of the macro cell, comprising:
    judging whether a terminal that is accessible to the femto cell enters the macro cell;
    transmitting an interval switching request to the femto base station when the terminal enters the macro cell; and
    periodically receiving only a preamble before the base station is switched into an available interval from an interval.

13. The method of claim 12, wherein
    the femto base station is switched into the available interval from the interval that is operated when the terminal is not present in the femto cell region in accordance with the interval switching request.

14. The method of claim 13, wherein
    the interval that is operated when the terminal is not present is a partially-available interval or an unavailable interval.

15. A device for managing an operation of a first base station managing a first cell, comprising:
    a reception unit receiving an interval switching request from a second base station managing a second cell that is larger than the first cell while including the first cell; and
    an interval switching unit switching the interval of the first base station in accordance with the interval switching request
    wherein the interval switching unit switches from an interval that is operated when the terminal is not present in the first cell region in accordance with the interval switching request into an available interval,
    wherein the interval that is operated when the terminal is not present is a partially-available interval or an unavailable interval,
    wherein the device further comprises
    a broadcasting unit that does not perform broadcast when the first base station is in the unavailable interval, broadcasts only a preamble or slimmed broadcast information in addition to the preamble when the first base station is in the partially-available interval, and broadcasts all system information when the first base station is in the available interval.

16. The device of claim 15, further comprising
    a judgment unit that judges the legality of the interval switching request.

* * * * *